R. M. G. PHILLIPS.
AUTOMATIC COOKING APPARATUS COOKING COMPARTMENT.
APPLICATION FILED NOV. 2, 1914.
1,166,001.
Patented Dec. 28, 1915.
3 SHEETS—SHEET 2.
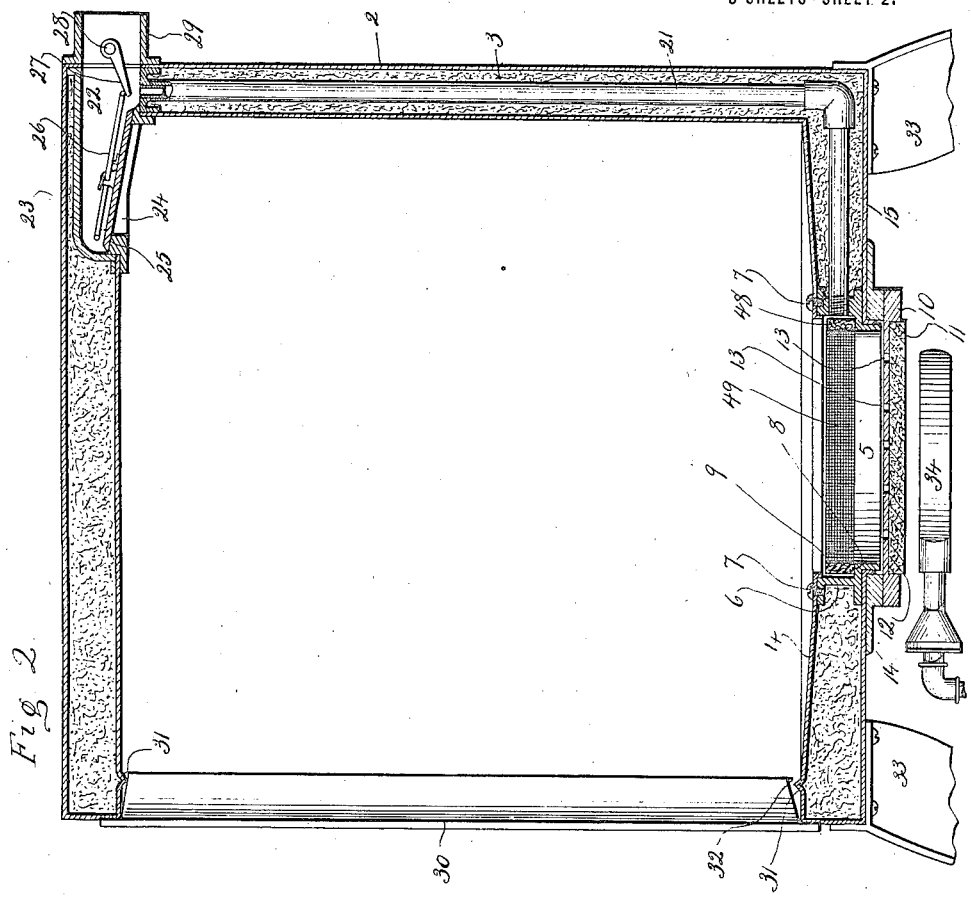
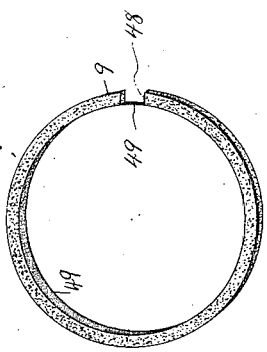
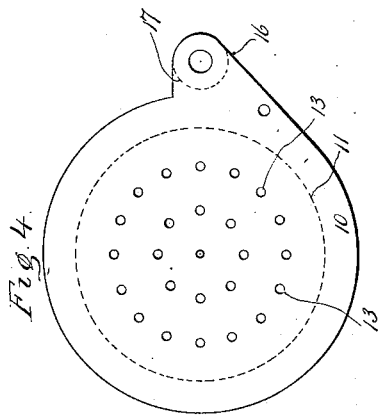

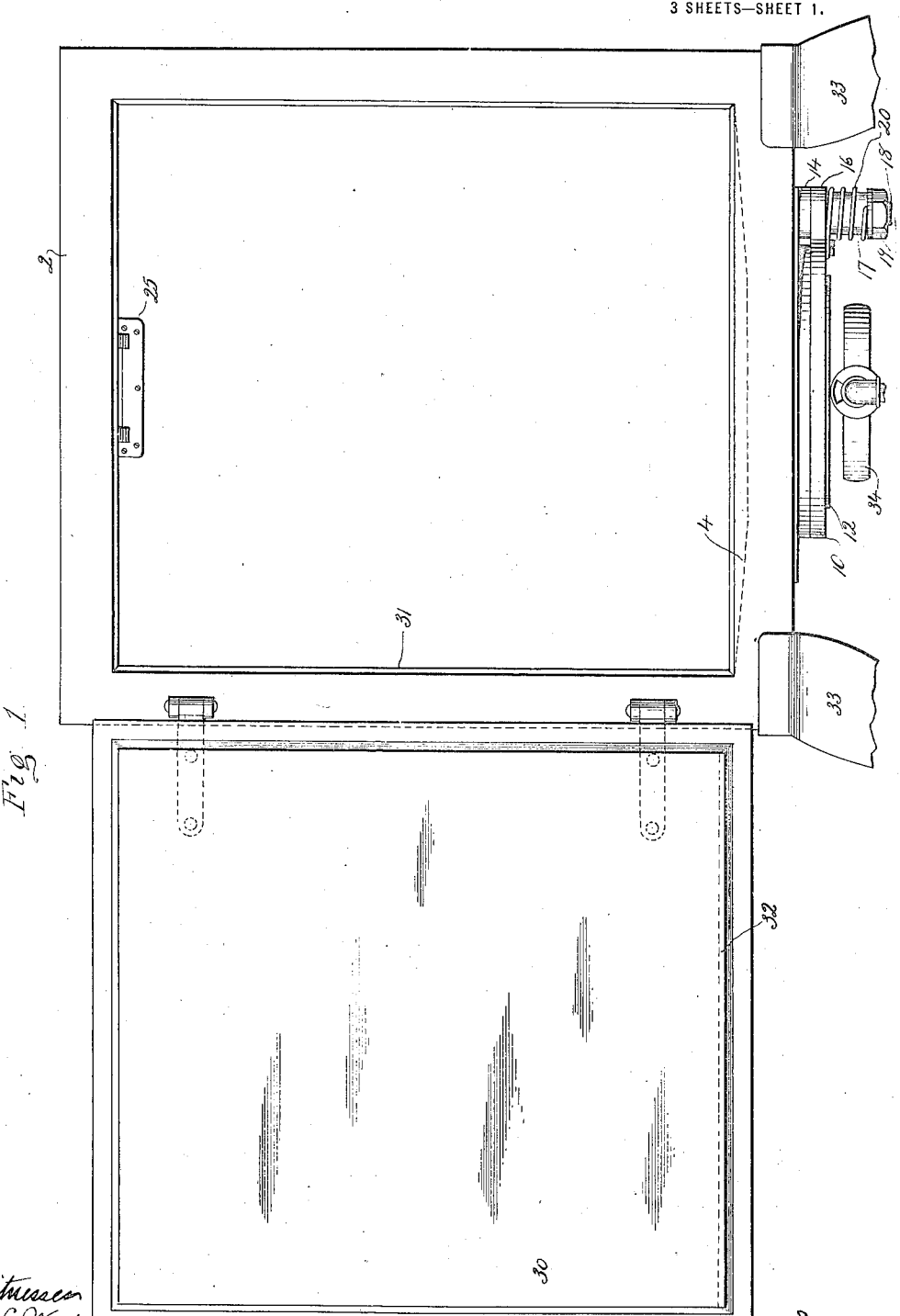

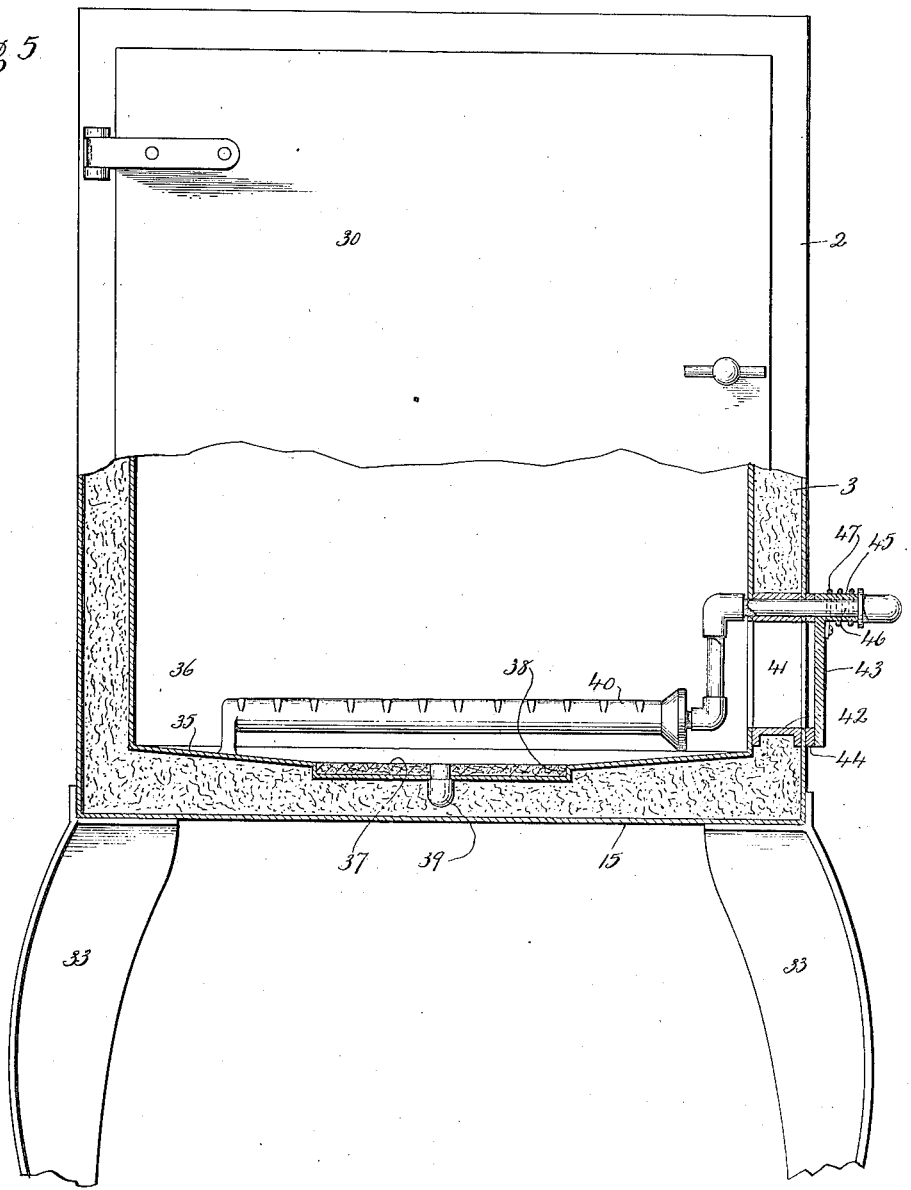

UNITED STATES PATENT OFFICE.

ROSS M. G. PHILLIPS, OF WEST HAVEN, CONNECTICUT.

AUTOMATIC-COOKING-APPARATUS COOKING-COMPARTMENT.

1,166,001.　　　　　Specification of Letters Patent.　　Patented Dec. 28, 1915.

Application filed November 2, 1914.　Serial No. 869,892.

*To all whom it may concern:*

Be it known that I, ROSS M. G. PHILLIPS, a citizen of the United States, residing at West Haven, in the county of New Haven and State of Connecticut, have invented a new and useful Improvement in Automatic - Cooking - Apparatus Cooking - Compartments; and I do hereby declare the following, when taken in connection with the accompanying drawings and the characters of reference marked thereon, to be a full, clear, and exact description of the same, and which said drawings constitute part of this application, and represent, in—

Figure 1 a view in front elevation of an automatic cooking apparatus cooking compartment constructed in accordance with my invention, with the door open and the legs broken away. Fig. 2 a view of the compartment in vertical central section from front to rear. Fig. 3 a detached perspective view of the non-inflammable absorbing ring. Fig. 4 a detached plan view of the shutter used as a closure for the ingress draft-passage. Fig. 5 a broken view partly in front elevation and partly in vertical section of one of the modified forms which my improved cooking compartment may assume.

My invention relates to an automatic cooking apparatus, and more particularly to a cooking compartment or oven therefor, the object being to produce a simple and convenient cooking compartment constructed with particular reference to taking care of the condensed vapors thrown off by the food during that portion of the cooking operation following the closing of the ingress and egress passages of the compartment.

With these ends in view, my invention consists in a cooking compartment having certain details of construction as will be hereinafter described and pointed out in the claims.

In carrying out my invention as herein shown, I employ a double-walled rectangular cooking compartment or oven 2 the spaces between the walls of which are filled with insulating material 3, such as magnesia. The bottom 4 of the compartment is inclined in all directions toward a circular ingress draft-passage 5 located in its center and formed by a flanged spacing-ring 6 fastened to the bottom by screws 7 and offset on the inside at its lower end to form a seat 8 for an absorbing ring 9 made of asbestos or other non-inflammable material.

The ingress draft-passage 5 is closed by means of a disk-shaped shutter-like closure 10 having its lower face formed with a recess 11 for the reception of a circular absorbent pad 12 of asbestos or other non-inflammable material, the shutter having perforations 13 to permit condensed vapors to pass through it into the said pad.

A flanged closure-seat 14 applied to the shell 15 of the bottom of the compartment provides a seat for the shutter 10 when the same is in its closed position. The shutter is formed with an offsetting arm 16 furnished with a depending hub 17 receiving a stud 18 depending from the shutter-seat 14, the hub 17 being held in place upon the stud 18 by means of a nut 19. A helical spring 20 encircling the hub 17 provides for swinging the shutter into its closed position.

A wet steam pipe 21 located between the inner and outer walls of the bottom and sides of the compartment and embedded in the insulating packing 3 thereof, leads from the ingress draft-passage 5 into the housing 22 installed in the upper rear corner of the compartment for the reception of the damper or closure 23 provided for closing the egress draft-passage 24 which is formed within the damper-seat 25. The said damper 23 is furnished with a bail 26 engaged by a rock-arm 27 mounted upon a rock shaft 28 journaled at its ends in a flue-fitting 29. The means provided for manually opening the shutter 10 and damper 23, and for automatically controlling the said parts in closing, may be of any approved construction. Since such means form no part of my present invention, they are not shown herein.

To prevent any vapors thrown off from the food from working forward past the double walled door 30 of the compartment and dripping upon the floor, the four inner walls of the compartment are struck up to form a virtually continuous bead-like water brake or fender 31. The lower edge of the door 30 is furnished with a drip-flange 32 which overhangs the lower reach of the water brake 31 as shown in Fig. 2 whereby the entire inside of the compartment is drained into the inclined bottom 4 of the compartment, which is supported, as shown by legs 33.

During the first period of the cooking operation, when the burner 34, whatever its character may be, is lighted below the ingress draft-passage 5, any steam thrown off by the food will be carried upward and discharged through the egress draft-passage 24. However, during the second period of the cooking operation when the burner is extinguished and the ingress and egress draft-passages are closed and sealed, there is no escape provided for the steam which continues to be thrown off by the cooking food. The confined steam or vapors are now condensed upon the surfaces within the compartment and are drained by the inclined bottom 4 of the compartment into the ingress draft-passage 5 where they will be absorbed by the ring 9 until the same is saturated after which any excess liquid, if any, will be taken up by the pad 12 carried by the shutter 10. During the second period of the cooking operation, the driest of the steam will rise to the top of the oven, forcing the wettest of the steam to the bottom thereof. By providing an outlet in the pipe 21 for the wet steam, the cooking operation is facilitated, since this permits the driest steam to constantly work downward and replaces the wet steam which hinders cooking. When the burner is relighted for the next succeeding use of the apparatus, the heat developed will dry out the absorbing ring 9 and pad 12, the moisture thus driven out being carried off by the draft of the apparatus. The said ring and pad are thus kept in readiness for service.

In the modified construction shown in Fig. 5 of the drawings, the bottom 35 of the compartment 36 is inclined in all directions toward an absorbent pad 37 located in a shallow central recess 38 formed in the said bottom. A vent-pipe 39 rising through the said recess and pad provides for drawing off the wet steam. In this modified construction, the burner 40 which may be of any approved construction, is located within but near the bottom of the compartment 36, the ingress draft-passage 41 of which is located in the right hand side wall of the compartment and formed by a flanged spacing-ring 42. The said passage 41 is closed by a shutter 43 brought to a bearing upon a shutter-seat 44, and having a sleeve 45 swinging upon the feed-pipe 46 of the burner. A helical spring 47 encircling the sleeve 45 provides for swinging the shutter into its closed position. The means for manually opening and automatically closing the shutter may be of any approved construction and are not shown herein. The compartment 36 is also furnished with an egress draft-passage furnished with a closure which may be of any approved construction and which is not shown, nor the means for manually and automatically operating it, the said closures and means for manually and automatically operating the same forming no part of my present invention.

In the claims I use the term "absorbent pad" generically and with the intention of covering an absorbent mass of any material or shape. As shown in Fig. 3 the annular pad 9 is broken away as at 48 and reinforced by a gauze shield 49 to provide ready access for the wet steam from the passage 5 into the pipe 21.

I claim:

1. In a cooking apparatus, the combination with a cooking compartment having ingress and egress draft-passages, of closures for the said passages, a burner located adjacent to the said inlet draft-passage, and non-inflammable means for absorbing the vapors condensed within the said compartment, the said means being positioned to receive the drainage of the compartment and the heat of the said burner.

2. In a cooking apparatus, the combination with a cooking compartment having ingress and egress draft-passages, of closures therefor, a burner located adjacent to said burner, the bottom of the compartment the ingress draft-passage, and a non-inflammable absorbent pad located adjacent to the being inclined toward the said pad which receives the drainage of the compartment and the heat of the said burner.

3. In a cooking apparatus, the combination with a cooking compartment having ingress and egress draft-passages, the former being centrally located in the bottom of the compartment which is inclined in all directions toward it for the draining of the vapors of condensation into it, of a non-inflammable absorbent pad located in the said passage, closures for the said passages, and a burner located adjacent to the said ingress draft-passage, whereby the absorber is dried out by the burner when the same is lighted.

4. In a cooking apparatus, the combination with a cooking compartment having ingress and egress draft-passages and its bottom being adapted to drain the compartment into the former, of closures for the said passages, a burner located adjacent to the ingress draft-passage, and an annular non-inflammable absorbing pad located in the said ingress draft-passage and receiving the drainage of the compartment and dried out by the said burner.

5. In a cooking apparatus, the combination with a cooking compartment having ingress and agress draft-passages, the former being centrally located in the bottom of the compartment which is shaped to drain into the said passage, of closures for the said passages, a non-inflammable absorbing pad carried by the closure of the ingress draft-passage, and a burner located adjacent to the said ingress draft-passage and operating to dry out the said pad when the burner is lighted.

6. In a cooking apparatus, the combination with a cooking compartment having ingress and egress draft-passages, the former being centrally located in the bottom of the compartment which drains into it, of closures for the said passages, a burner located adjacent to the ingress draft-passage, a non-inflammable absorbing pad located in the ingress draft-passage, and a non-inflammable absorbing pad carried by the closure of the said passage.

7. In a cooking apparatus, the combination with a cooking compartment having ingress and egress draft-passages, the former being centrally located in the bottom of the compartment which drains into it, of closures for the said passages, a burner located beneath the said compartment below the said ingress draft-passage, and a non-inflammable absorbing pad carried by the closure of the said passage, the said pad receiving the drainage of the compartment and being dried out by the burner.

8. In a cooking apparatus, the combination with a cooking compartment having ingress and egress draft-passages, of closures therefor, a burner adjacent to the said ingress draft-passage, and a vapor pipe intersecting the lower end of the compartment for carrying off vapors thrown off by the food during that period of the cooking operation following the closing of the said passages.

9. In a cooking apparatus, the combination with a double-walled cooking compartment having ingress and egress draft-passages, of closures for the said passages, a burner, and a pipe located between the walls of the compartment and intersecting the said ingress draft-passage for carrying off the wet steam thrown off by the food during the period of the cooking operation following the closing of the said passages.

10. In a cooking apparatus, the combination with a cooking compartment having ingress and egress draft-passages, of a burner co-acting with the said inlet draft-passage, and non-inflammable means for absorbing the vapors condensed within the said compartment, said means being positioned to receive the drainage of the compartment and the heat of the said burner.

11. In a cooking apparatus, the combination with a cooking compartment having ingress and egress draft-passages and a door-opening, of a door for the said opening, a fender located within the said door-opening in position to prevent condensed vapors from working forward through the same, a burner co-acting with the said inlet draft-passage, and a non-inflammable body located adjacent to the said ingress draft-passage in position to receive the drainage of the compartment and the heat of the said burner.

12. In a cooking apparatus, the combination with a cooking compartment having ingress and egress draft-passages and a door-opening, of a fender located within the said opening and along the bottom of the said compartment, a door having a drip-flange located upon its lower inner edge and extending inward beyond the said fender, a burner co-acting with the said ingress draft-passage, and an absorbent body positioned to receive the drainage of the compartment and the vapor deflected by the said drip-flange and the heat of the said burner.

In testimony whereof I have signed this specification in the presence of two subscribing witnesses.

ROSS M. G. PHILLIPS.

Witnesses:
   FREDERIC C. EARLE,
   M. P. NICHOLS.